(12) United States Patent
Tseng et al.

(10) Patent No.: US 8,328,683 B2
(45) Date of Patent: Dec. 11, 2012

(54) TRANSMISSION ASSEMBLY FOR ELECTRIC VEHICLE

(75) Inventors: Chyuan-Yow Tseng, Pingtung County (TW); Chiu-Feng Lin, Pingtung County (TW); Li-Wen Chen, Pingtung County (TW)

(73) Assignee: National Pingtung University of Science and Technology, Pingtung County (TW)

( * ) Notice: Subject to any disclaimer, the term of this patent is extended or adjusted under 35 U.S.C. 154(b) by 519 days.

(21) Appl. No.: 12/636,844

(22) Filed: Dec. 14, 2009

(65) Prior Publication Data

US 2010/0160110 A1   Jun. 24, 2010

(30) Foreign Application Priority Data

Dec. 18, 2008 (TW) ............................... 97149415 A
May 11, 2009 (TW) ............................... 98115521 A

(51) Int. Cl.
*H02P 15/00* (2006.01)
(52) U.S. Cl. ...................... 477/8; 74/473.15; 74/473.34
(58) Field of Classification Search .................. 477/7, 8, 477/15, 20
See application file for complete search history.

(56) References Cited

U.S. PATENT DOCUMENTS

| 4,598,374 | A | * | 7/1986 | Klatt ................................. 701/60 |
| 4,712,640 | A | * | 12/1987 | Leigh-Monstevens et al. .............................. 180/336 |
| 5,035,113 | A | * | 7/1991 | Simonyi et al. ................. 60/390 |
| 5,129,278 | A | * | 7/1992 | Nakao ......................... 74/473.33 |
| 5,403,244 | A | | 4/1995 | Tankersley et al. |
| 5,780,979 | A | | 7/1998 | Kim |
| 6,196,079 | B1 | * | 3/2001 | Paparoni .................... 74/473.15 |
| 6,592,484 | B1 | | 7/2003 | Tsai et al. |
| 6,688,412 | B2 | | 2/2004 | Kima et al. |
| 6,712,734 | B1 | * | 3/2004 | Loeffler ............................ 477/5 |
| 2005/0120817 | A1 | * | 6/2005 | Sakamoto et al. .............. 74/335 |

* cited by examiner

*Primary Examiner* — Justin Holmes
(74) *Attorney, Agent, or Firm* — Alan Kamrath; Kamrath IP Lawfirm, PA

(57) ABSTRACT

A transmission assembly for an electric vehicle includes a transmission having an input shaft, an output shaft, and a gear train coupled between the input shaft and the output shaft. A motor includes an output coupled to the input shaft of the transmission. A motor controller is electrically connected to the motor and controls a rotating speed of the motor. A gear controller is electrically connected to the motor controller. The gear controller outputs a speed request signal to the motor controller, and the motor controller controls the rotating speed of the motor based on the speed request signal, allowing smooth engagement between the gear train and the output shaft.

13 Claims, 8 Drawing Sheets

TRANSMISSION ASSEMBLY FOR ELECTRIC VEHICLE

BACKGROUND OF THE INVENTION

1. Field of the Invention

The present invention relates to a transmission assembly for electric vehicles and, more particularly, to a transmission assembly for electric vehicles without a clutch.

2. Description of the Related Art

A typical car or motor car with a manual transmission includes a clutch for gear shifting purposes. To allow smooth shifting of gear, a driver must step on a clutch pedal to disengage an input shaft of the transmission from the power output. FIG. 1 shows a conventional manual transmission for a vehicle including an engine 90, a clutch 91, and a transmission 92. The transmission 92 includes an input shaft 921 coupled to an output shaft of the engine 90 via the clutch 91. The transmission 92 further includes an output shaft 922 and a gear train 923 coupled between the input shaft 921 and the output shaft 922. Accordingly, the engine 90 can rotate the output shaft 922 through the input shaft 921 and gear train 923. Taking shifting to the first gear as an example, the clutch 91 is disengaged, and a gear shift rod 93 is shifted to the first gear position to move a gear synchronizer 924 so that the rotating speed of the gear synchronizer 924 is the same as that of a first gear 925. However, the driver must be skillful enough to operate the clutch 91, and repeated operation of the clutch 91 and the gear shift rod 93 is laborious.

The transmission of FIG. 1 can be utilized with an electric vehicle having a motor 95, as shown in FIG. 2. The transmission is operated in the same way and, thus, has the same disadvantages.

To avoid troublesome operation of the clutch 91 by the driver, vehicles with an automatic manual transmission (AMT) or an automatic transmission (AT) utilizes an automatic transmission mechanism to control the clutch 91, so that a speed difference exists between the engine 90 and the transmission 92. However, the automatic transmission has a complicated structure and high costs.

Besides, since each above-mentioned transmission completes gear shifting via the gear synchronizer 924 attached to one end of the gear shift rod 93, the transmission 92 with a large volume has to be arranged adjacent to and below the gear shift rod 93. The above-mentioned arrangement greatly limits the selection in position of the transmission 92 and design in formation of the conventional manual transmission. As a result, there is a need for redesigning the transmission for a vehicle for implementation thereof.

SUMMARY OF THE INVENTION

The primary objective of the present invention is to provide a transmission assembly for an electric vehicle without a clutch.

Another objective of the present invention is to provide a transmission assembly for an electric vehicle that has low costs and that eliminates the troublesome clutch operations.

Another objective of the present invention is to provide a transmission assembly with variation in design and convenience in assembling.

A transmission assembly for an electric vehicle according to the preferred teachings of the present invention includes a transmission having an input shaft, an output shaft, and a gear train coupled between the input shaft and the output shaft. A motor includes an output coupled to the input shaft of the transmission. A motor controller is electrically connected to the motor and controls a rotating speed of the motor. A gear controller is electrically connected to the motor controller. The gear controller outputs a speed request signal to the motor controller, and the motor controller controls the rotating speed of the motor based on the speed request signal, allowing smooth engagement between the gear train and the output shaft.

In another aspect of the present invention, the transmission further comprises a gearshift assembly having a gear shift rod, a pivotable arm with a first end coupling with the gear shift rod and a second end, a first sensor connecting to a bottom end of the gear shift rod, and a second sensor coupling with the second end of the pivotable arm. Besides, the gear controller comprises a first driving module electrically connecting with the first sensor, a second driving module electrically connecting with the second sensor, a shifting unit mechanically coupling to the gear train of the transmission, a first linking rope linking the first driving module and the shifting unit, and a second linking rope linking the second driving module and the shifting unit.

Gear shifting operation of the transmission assembly according to the preferred teachings of the present invention can be easily controlled by the driver. The transmission assembly according to the preferred teachings of the present invention has a simplified structure and low manufacturing costs.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
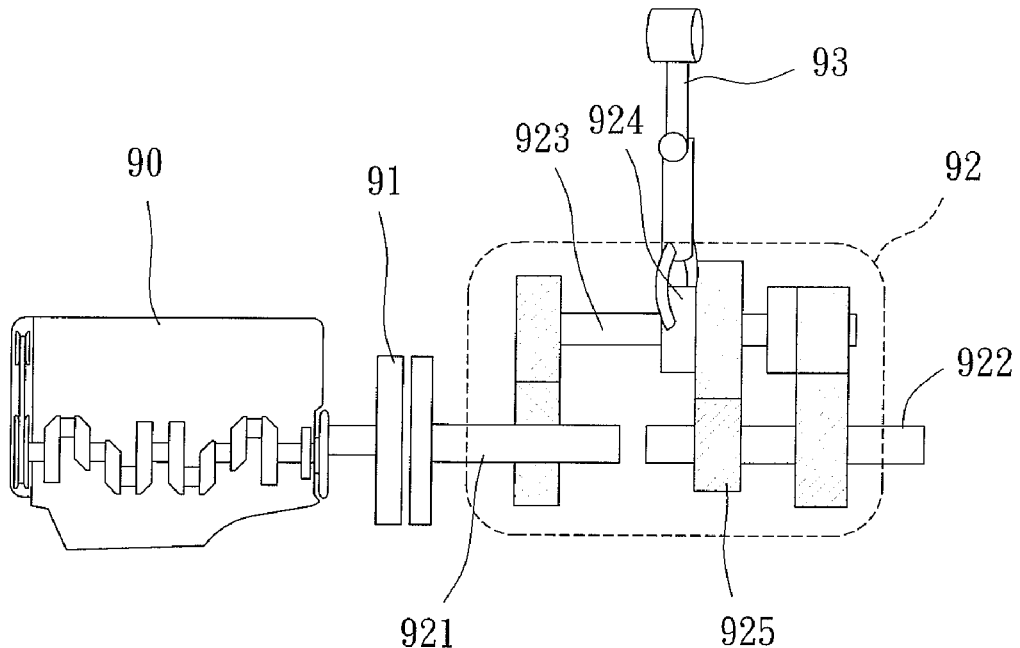
FIG. 1 shows a schematic view of a conventional manual transmission for a vehicle having an engine.
Figure 2:
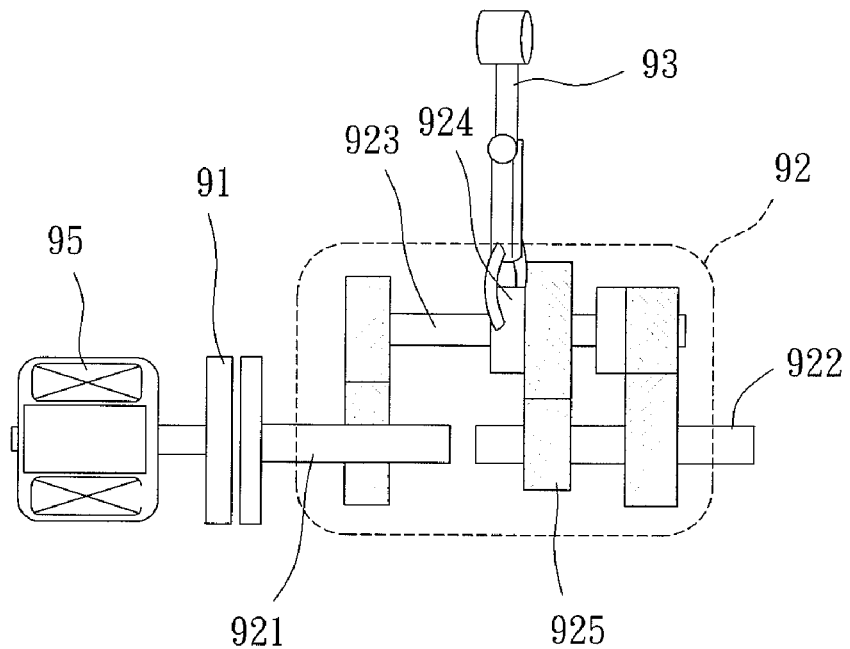
FIG. 2 shows a schematic view of a conventional manual transmission for an electric vehicle.
Figure 3:
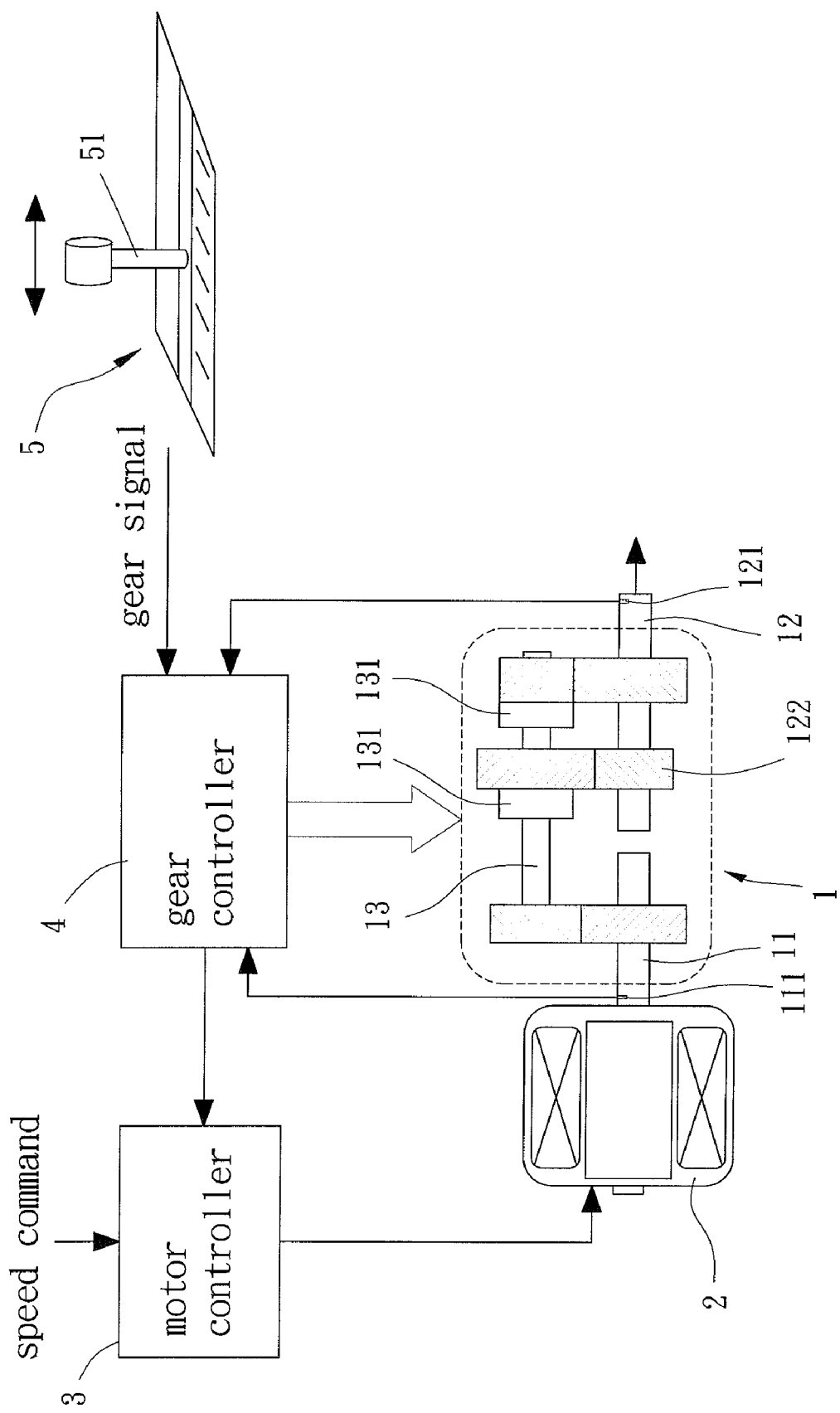
FIG. 3 shows a schematic diagram view of a transmission assembly for an electric vehicle according to the preferred teachings of the present invention.

A transmission assembly according to the preferred teachings of the present invention is shown in FIG. 3 of the drawings and generally includes a transmission 1, a motor 2, a motor controller 3, and a gear controller 4. The transmission 1 includes an input shaft 11, an output shaft 12 coupling to a chassis system of a car equipped with the present invention, and a gear train 13 coupled between the input shaft 11 and the output shaft 12. The gear train 13 provides a desired reduction ratio between the input shaft 11 and the output shaft 12. Furthermore, the gear train 13 includes a plurality of synchronizers 131 to make the rotating speed of the gear train 13 the same as the output shaft 12. A first speed sensor 111 is mounted on the input shaft 11 for detecting a rotating speed of the input shaft 11. A second speed sensor 121 is mounted on the output shaft 12 for detecting a rotating speed of the output shaft 12.

The motor 2 is preferably a servomotor and includes an output coupled to the input shaft 11. The motor controller 3 is electrically connected to the motor 2 for controlling a rotating speed of the motor 2. Besides, the motor controller 3 also connects with an accelerator pedal sensor, which detects the position of an accelerator pedal and correspondingly generates a speed command, to receive the speed command and control the speed of the motor 2 according to the accelerator pedal position. Thus, through the motor 2, the motor controller 3 may control the speed of the car in accordance with the accelerator pedal position controlled by a driver. The gear controller 4 is electrically connected to the motor controller 3 while mechanically coupling to the gear train 13 of the transmission 1. Furthermore, the gear controller 4 is electrically connected to the first and second speed sensors 111 and 121. The gear controller 4 receives the rotating speeds detected by the first and second speed sensors 111 and 121 and outputs a speed request signal to the motor controller 3 after calculation by programs. The motor controller 3 increases or reduces the rotating speed of the motor 2 based on the speed request signal, so that a speed difference within an acceptable range allowing easy shifting exists between the input shaft 11 and the output shaft 12 can be obtained.

Taking shifting to the first gear 122 as an example, a driver moves a gear shift rod 51 of a gearshift assembly 5 to the first gear 122. A series of gear signals indicative of movement of the gear shift rod 51 to the first gear 122 is sent out to the gear controller 4 from the gearshift assembly 5. At the same time, the gear controller 4 receives data of the rotating speeds of the input and output shafts 11 and 12 detected by the first and second speed sensors 111 and 121. The gear controller 4 outputs a speed request signal to the motor controller 3 after calculation by the programs. The motor controller 3 receiving the speed request signal controls the rotating speed of the motor 2 to accelerate or decelerate the input shaft 11 until the rotating speed of the input shaft 11 is the same as that of the synchronizers 131 of the gear train 13. By synchronizing the rotating speeds of the synchronizers 131 and the output shaft 12, the rotating speed of the synchronizers 131 is the same as that of the output shaft 12. Accordingly, with the mechanical coupling between the gear controller 4 and gear train 13, the gear controller 4 shifts the gear train 13 to accomplish the gear shifting operation. Thereby, the gear shifting operation completed through the gear controller 4 and gear train 13 is smooth and avoids the disadvantages of troublesome operation of the clutch pedal while providing a simplified structure. Furthermore, unlike an automatic transmission responsive to the operation of the engine, the gear shifting operation of the transmission assembly according to the preferred teachings of the present invention can be controlled by the driver while significantly reducing the manufacturing costs.

Specifically, referring to FIGS. 4 and 5, the gearshift assembly 5 for generation of the gear signals and the gear controller 4 for electrically adjusting the rotating speed of the motor 2 and for mechanically shifting the gear train 13 are illustrated in detail in the following. The gearshift assembly 5 includes the gear shift rod 51, an end joint 52, a pivotable arm 53, a first sensor 54 and a second sensor 55. The gear shift rod 51 has a ball pivot 511 rotatably received in a case 6 without motion relative to the gearshift assembly 5, to execute a seesaw movement about the ball pivot 511. A top end of the gear shift rod 51 is for a user to handle and operate, while a bottom end of the gear shift rod 51 couples with the end joint 52. The pivotable arm 53 is preferably an L-shaped bar with a pivotal section 531 at a bent corner of the L-shaped bar, a first end 532 and a second end 533. The pivotal section 531 rotatably couples with the case 6 through a stick "T" for the first and second ends 532 and 533 to rotate about the stick "T," with another stick "S" linking the ball pivot 511 and the first end 532. Accordingly, rotation of the ball pivot 511 can be transferred into rotation of the second end 533 about the pivotal section 531. The first sensor 54 has a coupling end 541 connecting with the end joint 52 for sensing the motion of the bottom end of the gear shift rod 51, an adjustable resister 542 able to adjust resistance according to the motion of the bottom end, and a terminal 543 electrically connecting with the adjustable resister 542 and transferring instant resistance value of the adjustable resister 542 into an entered gear signal. Similarly, for sensing the rotation of the ball pivot 511 through the pivotable arm 53 and accordingly generating a pre-entering gear signal, the second sensor 55 has a coupling end 551, an adjustable resister 552, and a terminal 553 operable in a manner similar to that of those of the first sensor 54. Namely, for the second sensor 55, what is different from the first sensor 54 is that the coupling end 551 connects with the second end 533 of the pivotable arm 53, while the adjustable resister 552 is able to adjust resistance according to the motion of the second end 533 for the terminal 553 to output the pre-entering gear signal.

Figure 4:
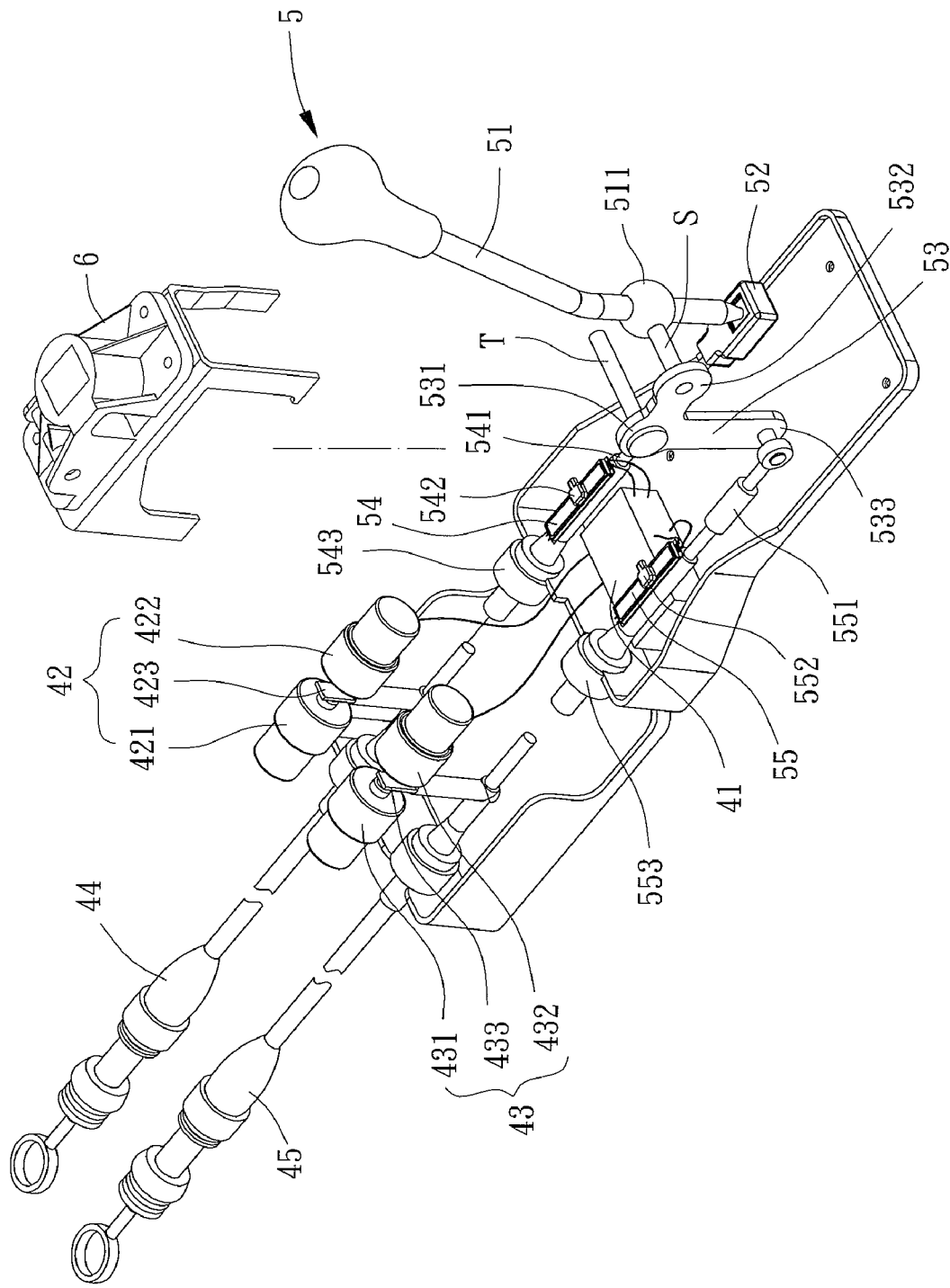
FIG. 4 shows a perspective view of a combination of a gear controller and a gearshift assembly of the preferred teachings of the present invention.
Figure 5:
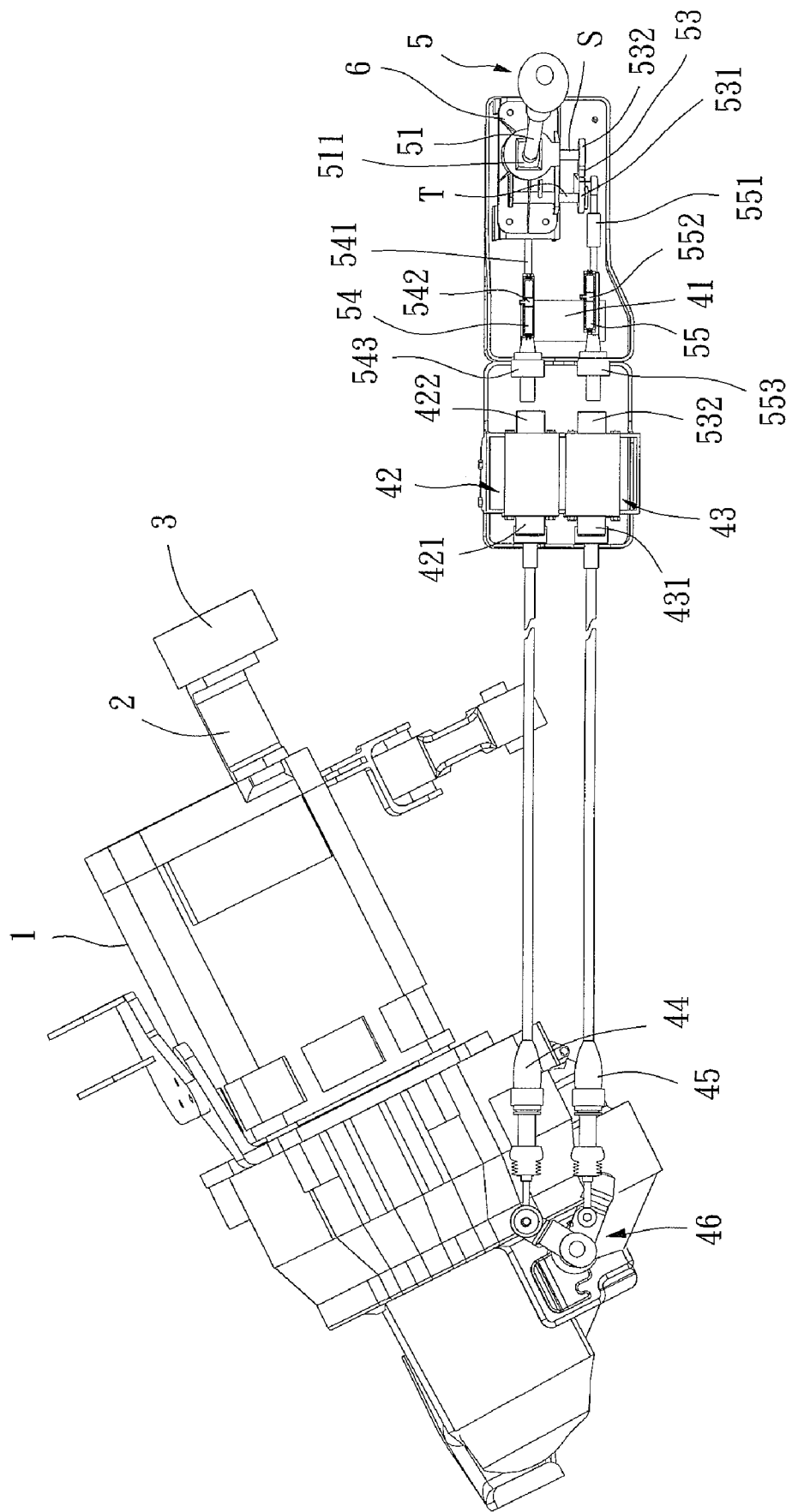
FIG. 5 shows a top view of the preferred teachings of the present invention.

Still referring to FIGS. 4 and 5, the gear controller 4 includes a computing unit 41, a first driving module 42, a second driving module 43, a first linking rope 44, a second linking rope 45, and a shifting unit 46. The computing unit 41 respectively and electrically connects to the first and second speed sensors 111 and 121, the motor controller 3, the terminals 543 and 553, and the first and second driving modules 42 and 43. Thereby, the computing unit 41 receives the rotating speeds detected by the first and second speed sensors 111 and 121 and the gear signals generated by the transferring terminals 543 and 553, processes the programs, and outputs the speed request signal to the motor controller 3 and a series of driving signals to the first and second driving modules 42 and 43. The first driving module 42 includes two control members 421 and 422 with an interval therebetween and an actuated member 423 with an end extending into the interval and able to swing between the two control members 421 and 422, while another end of the actuated member 423 couples with the first linking rope 44. The second driving module 43 is identical to the first driving module 42 and includes two control members 431 and 432 and an actuated member 433 arranged in the same manner with those of the first driving module 42 as shown in FIG. 4. Further, regarding the second driving module 43, what is different from the first driving modules 42 is that, instead of coupling with the first linking rope 44, an end of the actuated member 433 opposite to an end thereof extending into an interval between the two control members 431 and 432 couples with the second linking rope 45. Each of the control members 421, 422, 431 and 432 is preferably an electromagnet, while the actuated members 423 and 433 are made of permeable material such as iron alloy.

Both the first and second linking ropes 44 and 45 are ropes with high mechanical strength, and an end of each linking rope 44 or 45, which is free from the actuated member 423 or 433, connects to the shifting unit 46. The shifting unit 46 mechanically couples to the gear train 13 of the transmission 1 to shift the gear train 13.

Please refer to FIGS. 6-9. In order to further expound the operation of the gear controller 4 and gearshift assembly 5 of the present invention, a cover with a groove 50 shown in FIGS. 6 and 10 for the gear shift rod 51 to slide along is applied for illustration purpose. Moreover, with a design of positions of the neutral gear and other gears, the top end of the gear shift rod 51 must be moved in routes along at least one of a X axis and a Y axis to complete the gear shifting operation. The X axis and the Y axis are unparallel, and are preferably perpendicular to each other. Specifically, please note that, with the above-mentioned cover, the position of the neutral gear is arranged at the center of the groove 50. Furthermore, the pre-entering gear signal is designed to be generated when the top end of the gear shift rod 51 laterally moves along the X axis, and the entered gear signal is designed to be generated when the top end of the gear shift rod 51 longitudinally moves along the Y axis. Besides, in order to erase a feeling of time delay caused by gear-shifting, the groove 50 preferably includes routes extending along the X axis and the Y axis. Moreover, the pre-entering gear signal can be switched between a first value and a second value to identify which way the lateral motion of the top end of the gear shift rod 51 is moved. Similarly, the entered gear signal can also be switched between the first value and the second value to identify which way the longitudinal motion of the top end of the gear shift rod 51 is moved. For example, the first value may correspond to a left motion or a forward motion, while the second value corresponds to a right motion or a backward motion.

Figure 6:
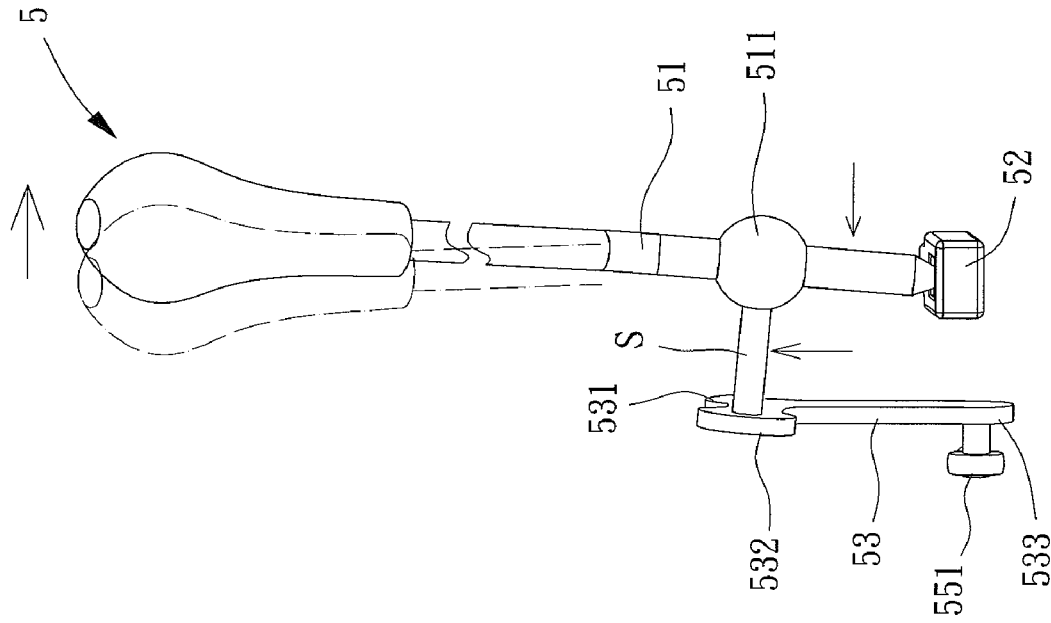
FIG. 6 shows a schematic view of a cover with a groove when the gearshift assembly generates a pre-entering gear signal.
Figure 7:
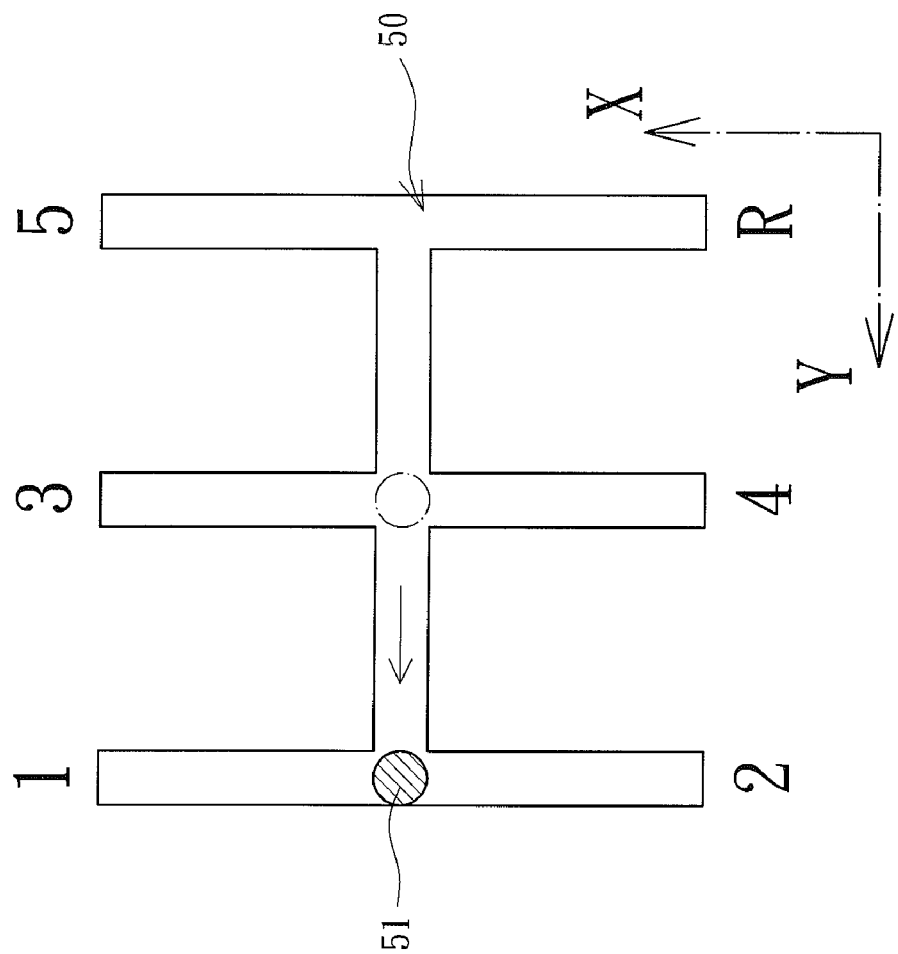
FIG. 7 shows a perspective view of a combination of a gear shift rod and a pivotable arm when the gearshift assembly generates the pre-entering gear signal.

Taking shifting to the first gear from the neutral gear as an example, referring to FIG. 6, the top end of the gear shift rod 51 is laterally shifted left along the X axis to a waiting position. With the lateral and left motion of the top end of the gear shift rod 51, the ball pivot 511 rotates to lift up an end of the stick "S" connecting with the first end 532 of the pivotable arm 53 as shown in FIG. 7. Thereby, the pivotable arm 53 rotates about the pivotal section 531, and, thus, the second end 533 of the pivotable arm 53 pulls the coupling end 551 of the second sensor 55.

Figure 8:
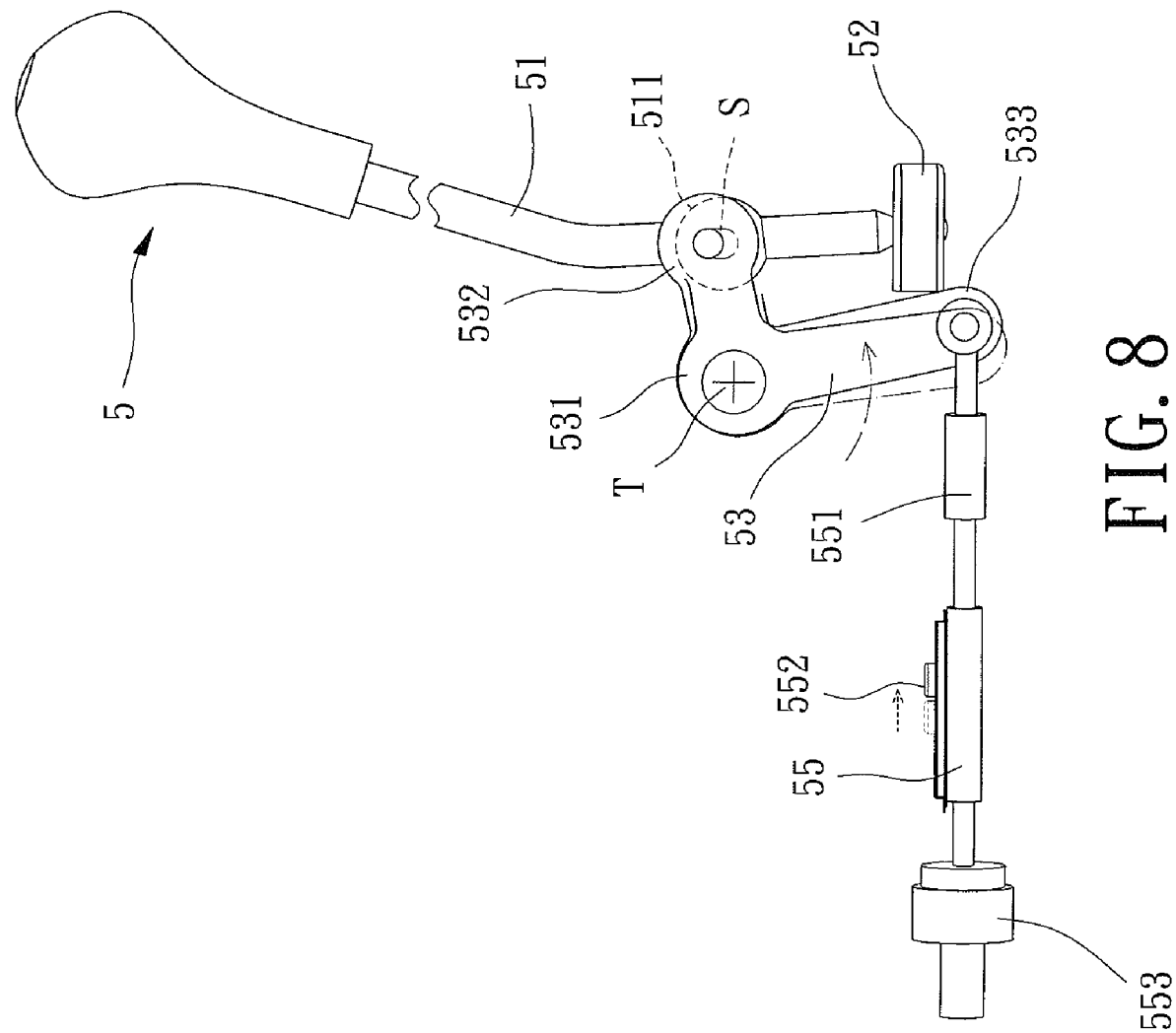
FIG. 8 shows a side view of the gearshift assembly when the gearshift assembly generates the pre-entering gear signal.
Figure 9:
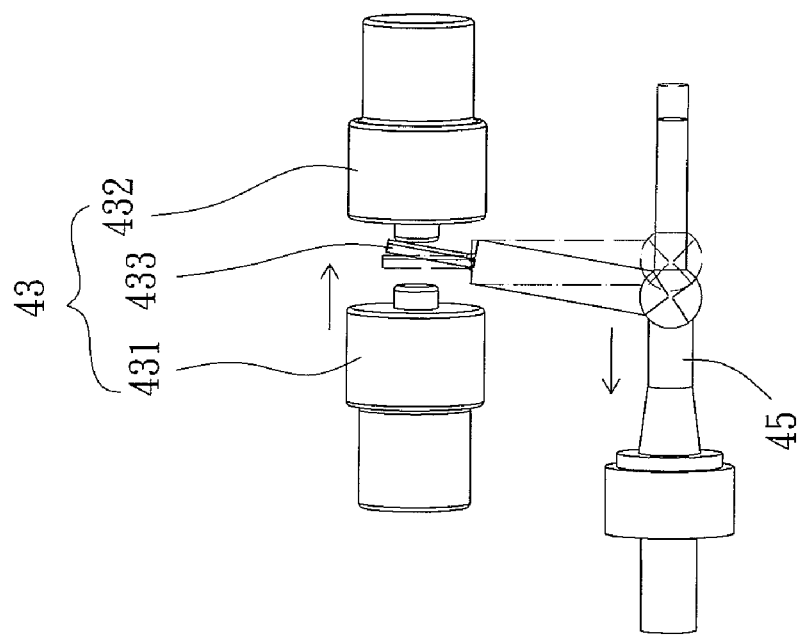
FIG. 9 shows a perspective view of a combination of a second driving module and a second linking rope when the gearshift assembly generates the pre-entering gear signal.

Referring to FIG. 8, with a motion of the coupling end 551 resulted from the pulling made by the pivotable arm 53, the adjustable resister 552 changes resistance thereof for the terminal 553 to generate the pre-entering gear signal with the first value. Accordingly, as shown in FIG. 9, the control member 432 is actuated to attract the actuated member 433. Thus, the actuated member 433 pushes the second linking rope 45 to move the gear train 13 into a pre-entering position through the shifting unit 46.

Figure 10:
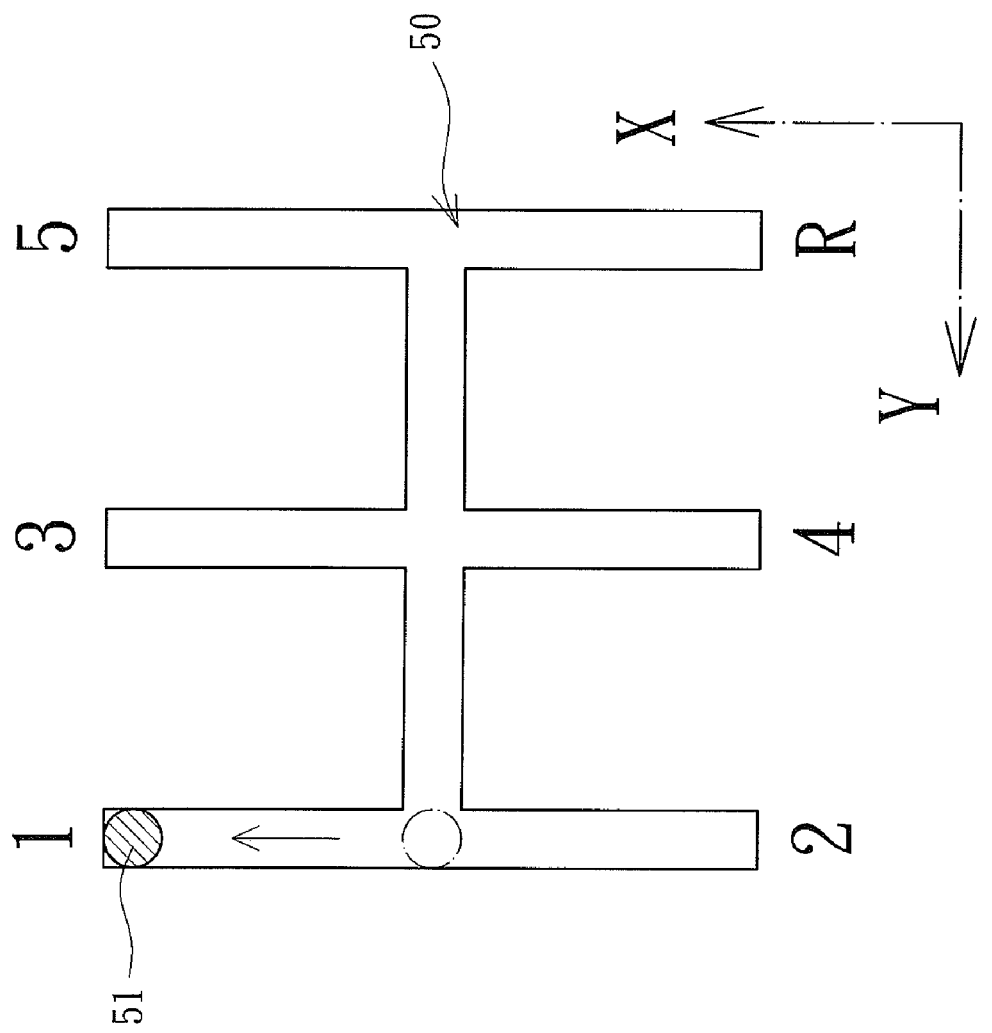
FIG. 10 shows a schematic view of the cover with the groove when the gearshift assembly generates an entered gear signal.
Figure 12:
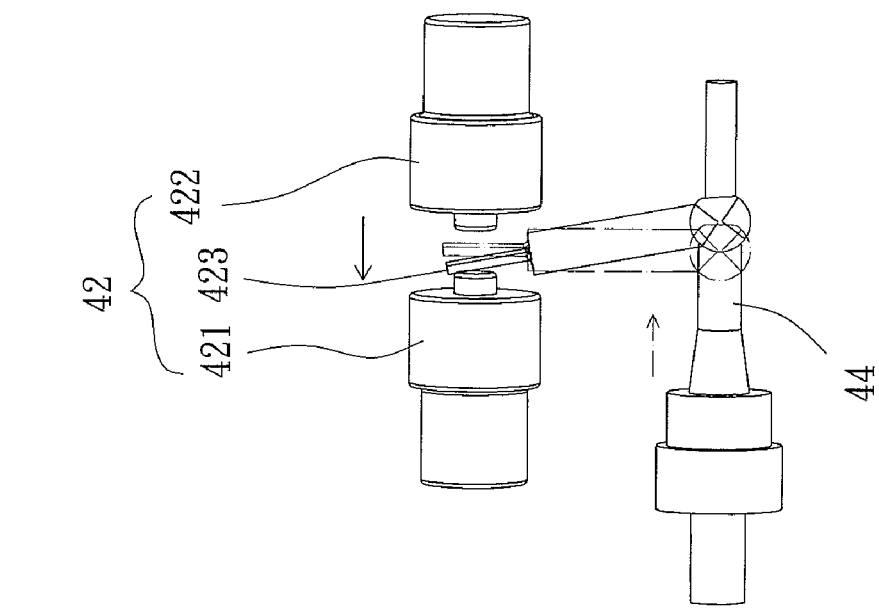
FIG. 12 shows a perspective view of a combination of a first driving module and a first linking rope when the gearshift assembly generates the entered gear signal.
Figure 11:
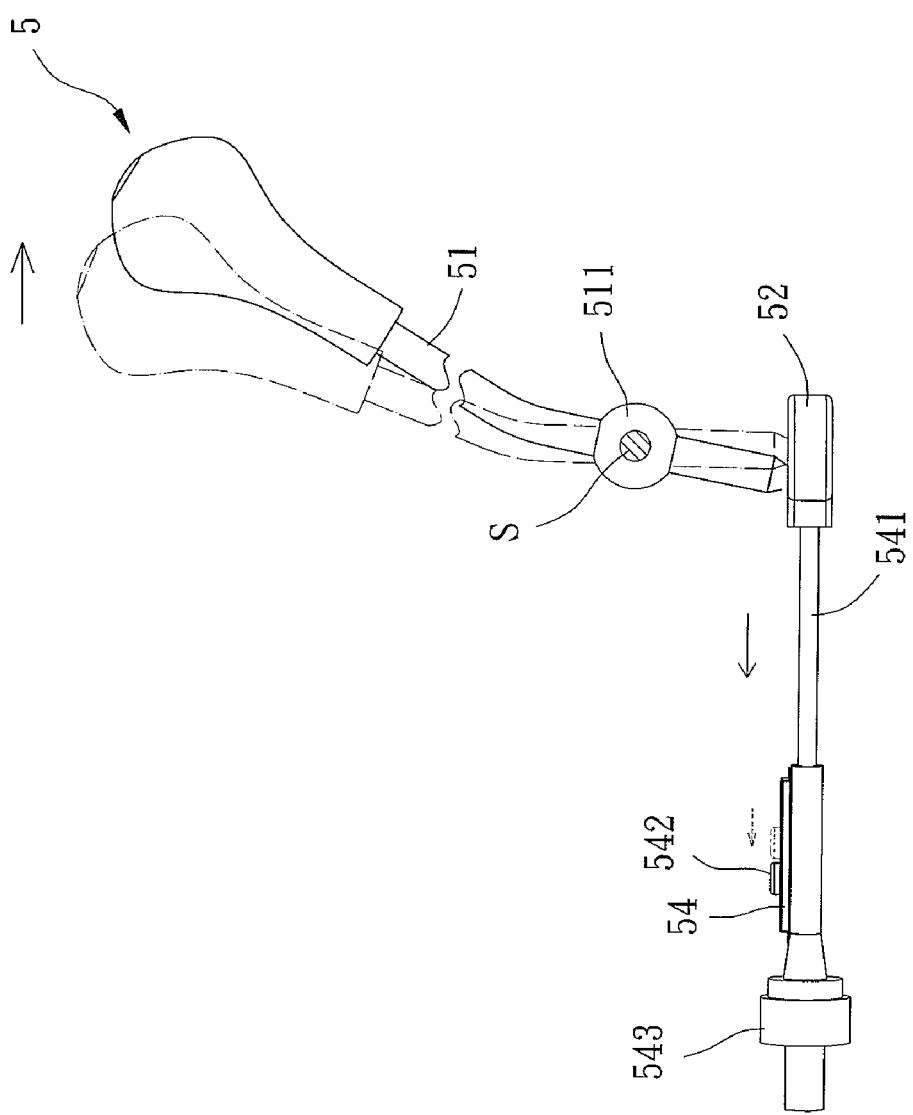
FIG. 11 shows a cross-sectional view of the gearshift assembly when the gearshift assembly generates the entered gear signal.

Further, with FIGS. 10-12 as references, the following contents illustrate the remaining step for completing the operation in gear shifting from the neutral gear to the first gear. The top end of the gear shift rod 51 is longitudinally shifted forwards to the position of the first gear along the Y axis. Thereby, the bottom end of the gear shift rod 51 rotates about the ball pivot 511 and pushes the coupling end 541 of the first sensor 54. With a motion of the coupling end 541 resulted from the pushing made by the bottom end of the gear shift rod 51, the adjustable resister 542 changes resistance thereof for the terminal 543 to generate the entered gear signal with the first value. Accordingly, as shown in FIG. 12, the control member 421 is actuated to attract the actuated member 423. Thus, the actuated member 423 pulls the first linking rope 44 to move the gear train 13 into an entered position through the shifting unit 46.

According to the above-mentioned structures, the attraction of the control members 421, 422, 431 and 432 for the actuated members 423 and 433 changes in accordance with the resistance of the adjustable resisters 542 and 552, to precisely adjust swing angles of the actuated members 423 and 433. Please note that even if the arrangement of the groove 50 of the cover and the design of the positions of the gears are different from those disclosed in the above-mentioned embodiment, identification in motion of the gear shift rod 51 can still be accurately achieved through the precisely adjusted swing angles of the actuated members 423 and 433.

As a result, with the electrical connection between the gear controller 4 and gearshift assembly 5, the present invention can further provide variable selections in the arrangement in position of the gear shift rod 51. Namely, in the present invention, it is no longer necessary to arrange the gear controller 4 to be adjacent to and below the gear shift rod 51 like those of the conventional transmissions. Therefore, variation in design can be achieved, while convenience in assembling is also provided.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A transmission assembly for an electric vehicle comprising:
    a transmission including an input shaft, an output shaft, and a gear train coupled between the input shaft and the output shaft;
    a motor including an output coupled to the input shaft of the transmission;
    a motor controller electrically connected to the motor, with the motor controller controlling a rotating speed of the motor;
    a gear controller electrically connected to the motor controller, with the gear controller outputting a speed request signal to the motor controller, and with the motor controller controlling the rotating speed of the motor based on the speed request signal to synchronize rotating speeds of the input shaft and the output shaft of the transmission; and a gearshift assembly having a gear shift rod, a pivotable arm with a first end coupling with the gear shift rod and a second end, a first sensor connecting to a bottom end of the gear shift rod, and a second sensor coupling with the second end of the pivotable arm, wherein the gear controller comprises a first driving module electrically connecting with the first sensor, a second driving module electrically connecting with the second sensor, a shifting unit mechanically coupling to the gear train of the transmission, a first linking rope linking the first driving module and the shifting unit, and a second linking rope linking the second driving module and the shifting unit.

2. The transmission assembly as claimed in claim 1, further comprising: a first speed sensor mounted on the input shaft and electrically connected to the gear controller; and a second speed sensor mounted on the output shaft and electrically connected to the gear controller.

3. The transmission assembly as claimed in claim 1, with the gear train including a plurality of synchronizers to make the rotating speed of the gear train the same as that of the output shaft.

4. The transmission assembly as claimed in claim 1, with the first sensor having a coupling end connecting to the bottom end of the gear shift rod, an adjustable resister adjusting resistance according to motion of the bottom end, and a terminal electrically connecting with the adjustable resister.

5. The transmission assembly as claimed in claim 1, with the second sensor having a coupling end coupling with the second end of the pivotable arm, an adjustable resister adjusting resistance according to the motion of the bottom end, and a terminal electrically connecting with the adjustable resister.

6. The transmission assembly as claimed in claim 1, with the gear shift rod having a ball pivot received in a case to execute a seesaw movement about the ball pivot, and with the first end of the pivotable arm connecting to the ball pivot.

7. The transmission assembly as claimed in claim 6, with the pivotable arm being an L-shaped bar having a pivotal section and with the pivotal section rotatably coupling with the case.

8. The transmission assembly as claimed in claim 1, further comprising: a cover with a groove for the gear shift rod to slide along.

9. The transmission assembly as claimed in claim 8, with the groove including routes extending along two unparallel axes.

10. The transmission assembly as claimed in claim 1, with the first driving module having two control members with an interval therebetween and an actuated member with an end extending into the interval and another end coupling with the first linking rope.

11. The transmission assembly as claimed in claim 10, with each control member being an electromagnet and the actuated member being made of permeable magnetic material.

12. The transmission assembly as claimed in claim 1, with the second driving module having two control members with an interval therebetween and an actuated member with an end extending into the interval and another end coupling with the second linking rope.

13. The transmission assembly as claimed in claim 12, with each control member being an electromagnet and the actuated member being made of permeable magnetic material.

* * * * *